United States Patent [19]

Ikeda et al.

[11] 4,259,416
[45] Mar. 31, 1981

[54] BATTERY

[75] Inventors: Hironosuke Ikeda, Hirakata; Shigeaki Noda, Miki; Seiki Yoshida, Kakogawa, all of Japan

[73] Assignee: Sanyo Electric Co., Ltd., Moriguchi, Japan

[21] Appl. No.: 139,203

[22] Filed: Apr. 11, 1980

[30] Foreign Application Priority Data

Apr. 16, 1979 [JP] Japan .................................. 54-51019

[51] Int. Cl.³ ............................................ H01M 2/26
[52] U.S. Cl. ...................................... 429/94; 429/178
[58] Field of Search ................... 429/94, 164, 174, 178

[56] References Cited

U.S. PATENT DOCUMENTS

| 3,775,182 | 11/1973 | Patton et al. | 429/94 |
| 3,791,873 | 2/1974 | Angelovich | 429/194 |

FOREIGN PATENT DOCUMENTS

| 123428 | 8/1947 | Australia | 429/94 |
| 480611 | 1/1952 | Canada | 429/94 |
| 48-27090 | 8/1973 | Japan | 429/164 |

Primary Examiner—Donald L. Walton
Attorney, Agent, or Firm—Darby & Darby

[57] ABSTRACT

The present application discloses a battery comprising a collector rod serving also as a winding core and having at one end thereof a non-circle shape flange, positioning means formed at the flange, a spiral electrode formed by band-shape positive and negative electrode plates with a separator layer therebetween wound upon the collector rod with one of the electrode plates electrically connected to the collector rod, a battery vessel for housing the spiral electrode and to which the other of the electrode plates being electrically connected, a lid for hermetically closing the opening of the battery vessel through insulating packing and for simultaneously forming a terminal of said one electrode plate, and conductive resilient means having one end positioned by the positioning means and the other end in contact with the lid so that the conductive resilient means is pressed by the flange and the lid to electrically connect the collector rod and the lid to each other. The provision of the non-circle shape flange at one end of the collector rod serving also as a winding core, facilitates the winding operation of positive and negative electrode plates upon the collector rod, whereby the working efficiency may be improved. The positioning means at the flange eliminates the necessity of welding the conductive resilient means to the collector rod and permits the conductive resilient means to be positioned at a predetermined position all the times, whereby electrical connection means may be improved.

5 Claims, 5 Drawing Figures

BATTERY

FIELD OF THE INVENTION

The present invention relates to a battery in which a spiral electrode is formed by band-shape positive and negative electrode plates with a separator layer therebetween wound upon a collector rod serving also as a winding core and thus formed spiral electrode is housed in a battery vessel of which opening is closed by a lid through insulating packing, with the battery vessel and the lid simultaneously forming the terminals of the battery, respectively.

BACKGROUND OF THE INVENTION

In a conventional battery in which a spiral electrode has been formed by band-shape positive and negative electrode plates with a separator layer therebetween wound upon a collector rod serving also as a winding core and thus formed spiral electrode has been housed in a vessel, a fine round pin has been used as such collector rod. Accordingly, when these positive and negative electrode plates with a separator layer therebetween have been wound upon the collector rod, such collector rod comprising a round pin has been apt to be rotated idle and subsequently it has been necessary to fix fairly strongly one end of the collector rod to a winding machine. The working efficiency has therefore been lowered.

Furthermore, in a viewpoint of electrical connection means, when conductive resilient means of a coil spring has been merely disposed between the collector rod and the battery vessel, it has been feared that such conductive resilient means has easily come off from the desired position due to vibration or the like since the end area of the collector rod comprising a round pin has been small. It has therefore been necessary to spot-weld one end of the conductive resilient means to the collector rod. The working efficiency has therefore been lowered.

DISCLOSURE OF THE INVENTION

A battery in accordance with the present invention comprises a collector rod serving also as a winding core and having at one end thereof a flange formed into a non-circle shape, positioning means formed at the flange, a spiral electrode formed by band-shape positive and negative electrode plates with a separator layer therebetween wound upon the collector rod with one of these electrode plates electrically connected to the collector rod, a battery vessel for housing the spiral electrode and to which the other of the electrode plates being electrically connected, a lid for closing the opening of the battery vessel through insulating packing and for simultaneously forming a terminal of said one electrode plate, and conductive resilient means having one end positioned by the positioning means and the other end in contact with the lid so that said conductive resilient means is pressed by the flange and the lid to electrically connect the collector rod and the lid to each other.

BRIEF DESCRIPTION OF THE DRAWINGS

The present invention will be further described by way of example, with reference to the accompanying drawings, in which.

PREFERRED EMBODIMENTS OF THE PRESENT INVENTION

The description hereinafter will discuss a cylindrical lithium battery to which the present invention is applied, with reference to FIGS. 1 to 3.

Figure 1:
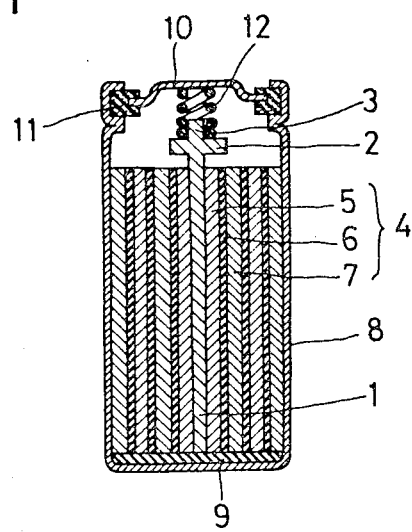
FIG. 1 is a longitudinal section view of a first embodiment of a battery in accordance with the present invention.
Figure 3:
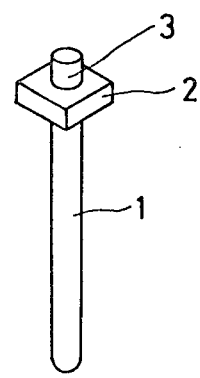
FIG. 3 is a perspective view of a collector rod used in the first embodiment in FIG. 1.
Figure 2:
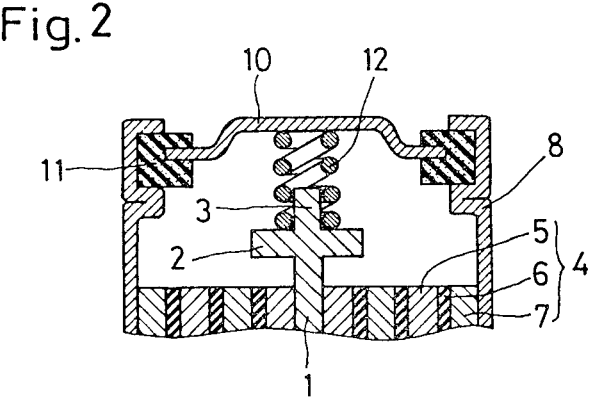
FIG. 2 is an enlarged longitudinal section view of main portions in FIG. 1.

In FIGS. 1 to 3, a negative electrode collector rod 1 serves also as a winding core and has at one end thereof a square-shape flange 2. A rod-shape projection 3 as positioning means is formed on the upper surface of the flange 2 in a unitary construction therewith.

A spiral electrode 4 is formed in such a way that a band-shape negative electrode plate 5 formed from a lithium rolled plate is electrically connected and secured at one end thereof to the collector rod 1, and a band-shape positive electrode plate 7 formed from, for example manganese dioxide as active material, is superposed on the negative electrode plate 5 with a separator layer 6 therebetween, and these negative electrode plate 5, separator layer 6 and positive electrode plate 7 are wound upon the collector rod 1 with the flange 2 attached to fixing jig means (not shown).

An insulating sheet 9 is disposed on the inner bottom surface of a battery vessel 8 simultaneously forming a terminal of the positive electrode. The spiral electrode 4 is housed in the battery vessel 8, and the positive electrode plate 7 located at the outermost circumference of the spiral electrode 4 is electrically connected to the battery vessel 8 by means of contact pressure.

A lid 10 hermetically closes the opening of the battery vessel 8 through insulating packing 11. Conductive resilient means 12 comprising for example a coil spring has one end to be positioned by being fitted to the projection 3 on the upper surface of the flange 2 and the other end to come in contact with the lower surface of the lid 10. The mounting of the lid 10 to the battery vessel 8 causes the conductive resilient means 12 to be pressed and such compressed conductive resilient means 12 causes the negative electrode plate 5 to be electrically connected, through the collector rod 1 and the conductive resilient means 12, to the lid 10 simultaneously forming a negative electrode terminal.

Figure 5:
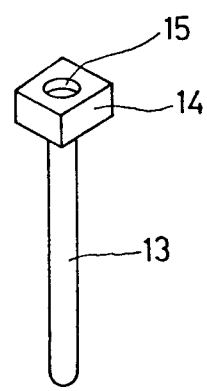
FIG. 5 is a perspective view of a collector rod used in the second embodiment in FIG. 4.
Figure 4:
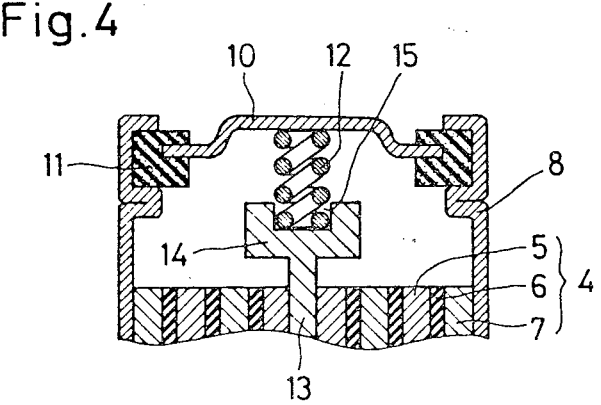
FIG. 4 is an enlarged longitudinal section view of main portions of a second embodiment of a battery in accordance with the present invention.

The description hereinafter will discuss a second embodiment of the present invention with reference to FIGS. 4 and 5.

It is to be noted that like parts are designated by like numerals used in the first embodiment shown in FIGS. 1 to 3.

This second embodiment is different from the first embodiment in positioning means formed on the upper surface of a non-circle shape flange 14 disposed at one end of a negative electrode collector rod 13.

In the second embodiment, as positioning means a concaved portion 15 is formed in the upper surface of the flange 14. One end of conductive resilient means 12 is fitted into this concave portion 15, so that the conductive resilient means 12 may be positioined at a predetermined position.

INDUSTRIAL UTILITY

According to the battery of the present invention, the non-circle shape flange formed at one end of the collector rod serving also as a winding core prevents the collector rod from being rotated idle when band-shape positive and negative electrode plates are wound upon the collector rod. Therefore, winding operation may readily be performed, thereby to enhance the working efficiency.

Furthermore, according to the present invention, the provision of positioning means at the flange eliminates the necessity of weldingly connecting one end of the conductive resilient means to the collector rod, and permits the conductive resilient means to be positioned at a predetermined position all the times, whereby electrical connection means may be improved.

What we claim:

1. A battery comprising:
    a collector rod serving also as a winding core and having at one end thereof a flange formed into a non-circle shape,
    positioning means formed at said flange,
    a spiral electrode formed by band-shape positive and negative electrode plates with a separator layer therebetween wound upon said collector rod with one of said electrode plates electrically connected to said collector rod,
    a battery vessel for housing said spiral electrode and to which the other of said electrode plates being electrically connected,
    a lid for hermetically closing the opening of said battery vessel through insulating packing and for simultaneously forming a terminal of said one electrode plate, and
    conductive resilient means having one end positioned by said positioning means and the other end in contact with said lid, said conductive resilient means being pressed by said flange and said lid to electrically connect said collector rod and said lid to each other.

2. A battery as set forth in claim 1, wherein the positioning means is a projection formed at the upper surface of the flange of the collector rod.

3. A battery as set forth in claim 1, wherein the positioning means is a concaved portion formed in the upper surface of the flange of the collector rod.

4. A battery as set forth in claim 1, wherein the conductive resilient means is a coil spring.

5. A battery as set forth in claim 1, wherein the positive and negative electrode plates constituting the spiral electrode are a band-shape negative electrode plate formed from a lithium rolled plate, and a band-shape positive electrode plate formed by manganese dioxide as active material, respectively.

* * * * *